J. C. Stoddard,
Horse Rake.
No. 29327.                                    Patented July 24, 1860.
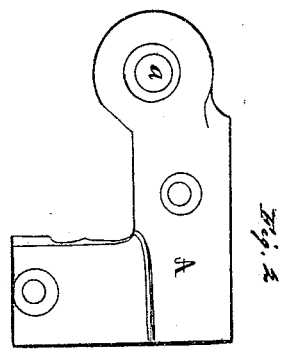
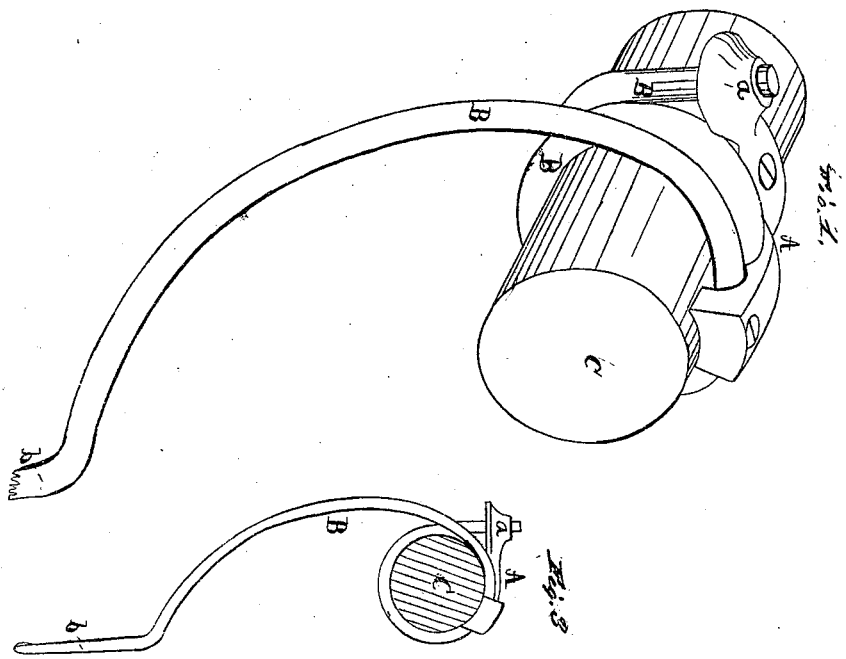
Witnesses:                    Inventor:

UNITED STATES PATENT OFFICE.

J. C. STODDARD, OF WORCESTER, MASSACHUSETTS.

IMPROVEMENT IN TEETH FOR SCATTERING HAY.

Specification forming part of Letters Patent No. 29,327, dated July 24, 1860.

*To all whom it may concern:*

Be it known that I, J. C. STODDARD, of Worcester, in the county of Worcester and State of Massachusetts, have invented a new and useful Improvement in Teeth for Scattering Hay; and I do hereby declare that the following is a full, clear, and exact description of the same, reference being had to the annexed drawings, making a part of this specification, in which—

Figure 1 is a perspective view, showing one of my scattering-teeth and a portion of the bar to which it is attached, together with the fastening-plate by which the tooth is secured to the bar. Fig. 2 is a plan of the fastening-plate; Fig. 3, a side elevation of the tooth, bar, and plate.

Similar letters of reference indicate corresponding parts in the several figures.

My invention is exclusively intended for use in that class of devices known as "hay-spreading machines," of which the patent granted to me June 28, 1859, is an example. I have therefore deemed it unnecessary to describe the construction of an entire machine, as they are made in various forms; but all of them are provided with a bar to which the teeth are attached.

C represents the bar of the hay-making machine, to which the scattering-teeth are fastened.

B represents my improved tooth, the upper part of which is coiled with two turns around the bar C, as shown in Fig. 1. The upper projecting end of the tooth B passes through an eye, *a*, in the holding-plate A, which is screwed upon the top of bar C, and extends longitudinally over the coils of the tooth B, and is then turned at right angles, so as to extend out beyond the top of the bar C to receive the upper end of the tooth B through the eye *a*, as shown in Fig. 1. The under surface of the plate A is grooved to receive the coils of the tooth, and thus hold them firmly in place. The peculiar formation of the plate A, in connection with the eye *a*, renders this a very secure yet simple method of attaching the teeth to the bar C. The body of the tooth B is made with a boss or swell in front, which outward-swelling form extends to within a very short distance of the lower extremity of the tooth, where a crook is made, and the remainder or tip of the tooth is straight. The tips of the teeth catch the grass, but the outward swelling of the teeth not only prevents the grass from gathering or collecting together, but scatters it upon the ground in the most thorough manner as fast as the tips pick it up.

I am aware that curved teeth have been employed in hay-making machines; but so far as I am aware those heretofore used have been so formed that they tended rather to gather the grass together, like rakes, than to separate and scatter the fibers thereof; but my improvement is intended to prevent the gathering of the grass in the first instance, besides thoroughly scattering it afterward.

I therefore do not claim broadly the use of curved teeth; but,

Having thus described my invention, what I claim as new, and desire to secure by Letters Patent, is—

1. The employment of teeth B, that are made with a straight tip and a boss or swell in front, which is presented to the grass, as herein shown and described, thereby preventing the gathering of the grass and causing it to be thoroughly scattered, all as set forth.

2. The employment, in combination with said teeth and the bar C, of the grooved angular fastening-plates A, provided with eyes *a*, as and for the purpose herein set forth.

J. C. STODDARD.

Witnesses:
P. EMORY ALDRICH,
C. BLODGETT, Jr.